US011512660B2

(12) United States Patent
Yoon et al.

(10) Patent No.: US 11,512,660 B2
(45) Date of Patent: Nov. 29, 2022

(54) INTERNAL COMBUSTION ENGINE MISFIRE AND AIR-FUEL RATIO IMBALANCE DETECTION AND CONTROLS

(71) Applicant: Cummins Inc., Columbus, IN (US)

(72) Inventors: Yongsoon Yoon, Indianapolis, IN (US); Avra Brahma, Fishers, IN (US)

(73) Assignee: Cummins Inc., Columbus, IN (US)

( * ) Notice: Subject to any disclaimer, the term of this patent is extended or adjusted under 35 U.S.C. 154(b) by 1 day.

(21) Appl. No.: 16/896,519

(22) Filed: Jun. 9, 2020

(65) Prior Publication Data

US 2020/0392917 A1    Dec. 17, 2020

Related U.S. Application Data

(60) Provisional application No. 62/884,485, filed on Aug. 8, 2019, provisional application No. 62/862,294, filed on Jun. 17, 2019.

(51) Int. Cl.
*F02D 41/14* (2006.01)
*F02P 5/145* (2006.01)
*F02D 41/30* (2006.01)

(52) U.S. Cl.
CPC ..... *F02D 41/1498* (2013.01); *F02D 41/1401* (2013.01); *F02D 41/1448* (2013.01); *F02D 41/1454* (2013.01); *F02D 41/30* (2013.01); *F02P 5/145* (2013.01); *F02D 2041/1417* (2013.01); *F02D 2041/1432* (2013.01); *F02D 2200/1015* (2013.01)

(58) Field of Classification Search
CPC .. F02D 41/14; F02D 41/1498; F02D 41/1401; F02D 41/1448; F02D 41/1454; F02D 41/30; F02D 2041/1417; F02D 2041/1432; F02D 2200/1015; F02P 5/145
See application file for complete search history.

(56) References Cited

U.S. PATENT DOCUMENTS

| 4,424,709 | A | | 1/1984 | Meier, Jr. et al. |
| 5,335,643 | A | * | 8/1994 | Abate ................. F02D 41/1401 123/684 |
| 5,387,253 | A | | 2/1995 | Remboski, Jr. et al. |
| 5,458,102 | A | * | 10/1995 | Tomisawa ........... F02D 41/1475 123/435 |
| 5,691,469 | A | | 11/1997 | Mezger et al. |
| 6,243,641 | B1 | | 6/2001 | Andrews et al. |
| 6,546,328 | B1 | | 4/2003 | Slicker |
| 6,651,490 | B1 | * | 11/2003 | Ceccarani ........... F02D 41/1448 73/114.74 |
| 8,739,613 | B2 | | 6/2014 | Mair et al. |
| 9,316,565 | B2 | | 4/2016 | Kappaganthu et al. |
| 10,030,593 | B2 | * | 7/2018 | Kappanganthu ...... F02D 41/009 |
| 10,330,035 | B2 | * | 6/2019 | Martin ................. F02D 41/123 |
| 10,539,087 | B2 | * | 1/2020 | Brahma ............. F02D 41/1454 |
| 10,914,253 | B2 | * | 2/2021 | Brahma ............. F02D 41/0085 |
| 11,131,259 | B1 | * | 9/2021 | Serrano ............... F02B 29/0493 |
| 2002/0131048 | A1 | * | 9/2002 | Tayag ................. G01B 9/02067 356/477 |

(Continued)

*Primary Examiner* — Hieu T Vo
(74) *Attorney, Agent, or Firm* — Taft, Stettinius & Hollister LLP (57) ABSTRACT

A system for detecting and controlling misfire and/or AFR imbalance conditions in cylinders of an internal combustion engine having a plurality of cylinders is disclosed.

18 Claims, 11 Drawing Sheets

(56) References Cited

U.S. PATENT DOCUMENTS

| | | | |
|---|---|---|---|
| 2004/0001274 A1* | 1/2004 | Chliwnyj | G11B 5/5508 |
| | | | 9/5.184 |
| 2006/0207526 A1* | 9/2006 | Kassner | F02P 5/1514 |
| | | | 123/1 R |
| 2008/0127945 A1* | 6/2008 | Hagel | F02D 41/1408 |
| | | | 123/436 |
| 2018/0087460 A1* | 3/2018 | Pathan | F02D 41/22 |
| 2019/0085782 A1* | 3/2019 | Brahma | F02D 1/0085 |
| 2022/0099714 A1* | 3/2022 | Ye | G01R 19/16542 |

\* cited by examiner

INTERNAL COMBUSTION ENGINE MISFIRE AND AIR-FUEL RATIO IMBALANCE DETECTION AND CONTROLS

CROSS-REFERENCE TO RELATED APPLICATIONS

The present application claims the benefit of the filing date of U.S. Provisional Application Ser. No. 62/862,294 filed on Jun. 17, 2019, and U.S. Provisional Application Ser. No. 62/884,485 filed on Aug. 8, 2019, each of which is incorporated herein by reference.

BACKGROUND

An internal combustion engines typically operates by introducing a mixture of air and fuel into a cylinder of an engine. A piston then compresses this mixture, and, depending on whether the engine is a compression ignition or spark ignition engine, the mixture combusts or is ignited in the cylinder.

A misfire condition occurs when one or more of the cylinders does not fire correctly, such as due to an interruption in the proper ratio of air to fuel, or air-fuel ratio (AFR), in the cylinder during combustion. Misfire may also occur due to improper ignition, fuel conditions, or mechanical issues with the engine. Maintaining a proper air-fuel ratio (AFR) is also desired for proper performance of certain components, such as catalysts.

Misfire and AFR imbalance issues may create power drop, reduced fuel efficiency, and higher emissions. For example, cylinder-to-cylinder AFR imbalance can deteriorate three-way catalyst operation of a spark ignition engine. Regulatory bodies are now requiring the detection of misfire and AFR imbalance conditions as part of on-board diagnostic requirements. Current techniques for misfire and AFR imbalance detection suffer from limitations dues to variable valve actuation, variation in combustion phasing, and cylinder deactivations. Therefore, further improvements in misfire diagnostics, AFR imbalance diagnostics, and/or controls of internal combustion engines in response to the same are needed.

SUMMARY

One embodiment is a unique system for diagnosing and/or controlling misfire and/or AFR imbalance of one or more cylinders of an internal combustion engine having a plurality of cylinders. Other embodiments include unique methods, systems, and apparatus to determine a misfire condition and/or AFR imbalance condition among the plurality of cylinders. In a further embodiment, the misfire condition and/or AFR imbalance condition is determined based on spectral analysis of multi-harmonics such as sliding discrete Fourier transform (SDFT), finite impulse response (FIR) filter, and Kalman filter (KF). Complex modulation may also be used to shift harmonics to DC for less computations and memory usage in the SDFT, FIR, and KF analyses.

The systems and methods disclosed herein can detect and locate misfire and/or AFR imbalance caused by single or multiple cylinders. The systems and methods disclosed herein can be used to detect misfire in engines with fixed or dynamic cylinder deactivation. Diagnosis of all possible combinations of misfiring and/or AFR imbalanced cylinders is possible. The diagnosis can be completed quickly in one engine cycle, such that both persistent and intermittent misfires can be diagnosed, resulting in fast convergence. More accuracy can be achieved by SDFT with crank angle domain sampling since spectral leakage in harmonics analysis is mitigated as compared to a standard DFT analysis. The disclosed systems and methods have broad applicability to any reciprocating machinery.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
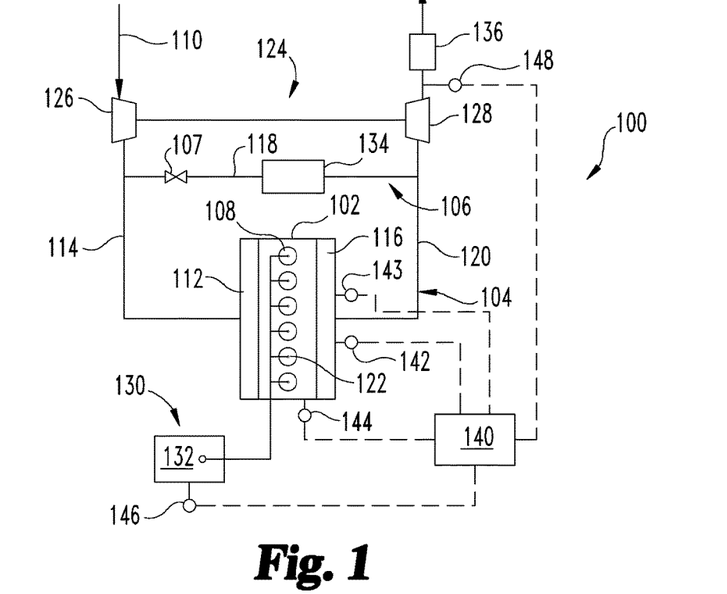
FIG. 1 is a schematic depiction of one embodiment of a system having an engine with an exhaust system, an intake system, an EGR system, a fuel system, a turbocharger system and a control apparatus.

Referencing FIG. 1, a system 100 is depicted having an engine 102 and an exhaust system 104. The engine 102 is an internal combustion engine of any type, and can include a stoichiometric engine, such as a natural gas engine, and/or a gasoline engine. In certain embodiments, the engine 102 is a combustion engine such as a natural gas engine, although embodiments with a gasoline engine, a diesel cycle engine, and combinations of these such as dual fuel engines are also contemplated. In certain embodiments, the engine 102 may be any engine type producing emissions that includes an exhaust gas recirculation (EGR) system 106, for example to reduce $NO_x$ emissions from the engine 102. The engine 102 includes a number of cylinders 108. The number of cylinders may be any number suitable for an engine, and the arrangement may be any suitable arrangement, such as an in-line or V-shaped arrangement. The system 100 includes an in-line six arrangement with six cylinders for illustration purposes only. The example engine 102 may further include an ignition source such as a spark plug (not shown) in certain embodiments.

In certain embodiments, the engine 102 is provided as a stoichiometric spark-ignition internal combustion engine, configured to develop mechanical power from internal combustion of a stoichiometric mixture of fuel and induction gas. As used herein, the phrase "induction gas" includes a charge flow, and may include fresh air, recirculated exhaust gases, or the like, or any combination thereof. The intake 110 includes an intake manifold 112 that receives charge flow from an intake passage 114 and distributes the induction gas to combustion chambers of cylinders 108 of the engine 102. Accordingly, an inlet of the intake manifold 112 is disposed downstream of an outlet of the intake passage 114, and an outlet of the intake manifold 112 is disposed upstream of an inlet of each of the combustion chambers in engine 102. An exhaust manifold 116 collects exhaust gases from combustion chambers of cylinders 108 of the engine 102 and conveys the exhaust gases to EGR passage 118 of EGR system 106 via exhaust passage 120. Accordingly, the inlet of the exhaust manifold 116 is disposed downstream of an outlet of each of the combustion chambers of the cylinders 108 in engine 102, and upstream of inlets to the respective EGR passage 118 and exhaust passage 120.

Injectors 122 may also be arranged within the engine 102 to deliver fuel directly or indirectly into the combustion chambers of cylinders 108 from a fuel system 130. In another embodiment, fuel is injected into the intake system upstream of the intake manifold 112, such as at the inlet of a compressor in the intake 110 or any other suitable location along intake passage 114. The fuel system 130 is structured to deliver fuel to the engine 102 in response to a fueling command that provides one or more of a fuel amount, timing, pressure and duration of fuel injection to each of the cylinders 108. The fuel system 130 includes a fuel source 132, such as a tank or pressurized supply of natural gas. In one embodiment, the fuel system 130 can be configured to deliver natural gas fuel to the engine 102 from fuel source 132. In another embodiment, the fuel system 130 can be configured to deliver another type of fuel, in addition to or in lieu of natural gas, to the engine 102. Examples of such additional fuels include gasoline, diesel, ethanol, and the like. In one embodiment, the fuel system 130 may include one or more injectors 122 configured to inject fuel into the engine 102 so that it may be combusted within a combustion chamber. Example injectors include direct injectors, port injectors, and/or fuel valves that inject into intake passage 114.

In the EGR system 106 of FIG. 1, the EGR flow is created by exhaust gas that recirculates in EGR passage 118 and combines with fresh air flow in intake passage 114 at a position upstream of intake manifold 112. Intake manifold 112 provides a charge flow including the intake flow combined with the flow to each cylinder 108. Intake passage 114 can include an intake throttle (not shown) to regulate the charge flow to cylinders 108. Intake passage 114 may also include a charge air cooler (not shown) to cool the charge flow provided to intake manifold 112. Intake passage 114 can also receive a compressed fresh air flow from a compressor 126 of a turbocharger 124. Intake passage 114 can also include a mixer to mix air, gaseous fuel, and EGR for delivery into the intake manifold. Turbocharger 124 also includes a turbine 128 in exhaust passage 120. Turbine 128 is operable via the exhaust gases to drive compressor 126 via a rod, shaft or the like. Turbine 128 can be a fixed geometry turbine, a variable geometry turbine with an adjustable inlet, or include a wastegate to bypass exhaust flow. It will be appreciated, however, that the turbocharger may be provided in any other suitable manner (e.g., as a multi-stage turbocharger, or the like), and may be provided with or without a wastegate and/or bypass. In certain embodiments, the system 100 does not include a compressor or any other type of boost pressure generating device in the intake 110. Other embodiments contemplate an exhaust throttle (not shown) in the exhaust system 104.

The EGR system 106 in the illustrated embodiment is a high pressure EGR system connected downstream of compressor 126 and upstream of turbine 128. Other embodiments contemplated low pressure EGR systems connected upstream of compressor 126 and downstream of turbine 128, combined low pressure and high pressure EGR systems, and dedicated EGR systems, for example. The example EGR system 106 includes an EGR cooler 134 and an EGR valve 107 in the EGR passage 118. In other embodiments, EGR passage 118 can include a bypass with a valve that selectively allows EGR flow to bypass the EGR cooler 134. The presence of an EGR cooler 134 and/or an EGR cooler bypass is optional and non-limiting. In certain embodiments, the system 100 does not include any EGR system 106.

The exhaust system 104 can further include an aftertreatment system 136 in exhaust passage 120 downstream of turbine 128 that is configured to treat emissions in the exhaust gas. Aftertreatment system 136 can include any aftertreatment components known in the art. Example aftertreatment components treat carbon monoxide (CO), unburned hydrocarbons (HC), nitrogen oxides ($NO_x$), volatile organic compounds (VOC), and/or particulate matter (PM). Aftertreatment system 138 can include a catalyst such as a three-way catalyst, a particulate filter, or any suitable emissions reduction or treating component.

In certain embodiments, the system 100 includes a controller 140 structured to perform certain operations to control operations of engine 102 and associated fuel system 130. In certain embodiments, the controller 140 forms a portion of a processing subsystem including one or more computing devices having memory, processing, and communication hardware. The controller 140 may be a single device or a distributed device, and the functions of the controller 140 may be performed by hardware or by instructions encoded on computer readable medium. The controller 140 may be included within, partially included within, or completely separated from an engine controller (not shown). The controller 140 is in communication with any sensor or actuator throughout the system 100, including through direct communication, communication over a datalink, and/or through communication with other controllers or portions of the processing subsystem that provide sensor and/or actuator information to the controller 140.

In certain embodiments, the controller 140 is described as functionally executing certain operations. The descriptions herein including the controller operations emphasizes the structural independence of the controller, and illustrates one grouping of operations and responsibilities of the controller. Other groupings that execute similar overall operations are understood within the scope of the present application. Aspects of the controller may be implemented in hardware and/or by a computer executing instructions stored in non-transient memory on one or more computer readable media, and the controller may be distributed across various hardware or computer based components.

Example and non-limiting controller implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements. In the illustrated embodiment, controller 140 is connected to exhaust manifold pressure (EMP) sensor(s) 142, oxygen sensor(s) 143, engine sensor(s) 144, fuel sensor(s) 146, and exhaust sensor(s) 148 as discussed further below.

The listing herein of specific implementation elements is not limiting, and any implementation element for any controller described herein that would be understood by one of skill in the art is contemplated herein. The controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure.

One of skill in the art, having the benefit of the disclosures herein, will recognize that the controllers, control systems and control methods disclosed herein are structured to perform operations that improve various technologies and provide improvements in various technological fields. Without limitation, example and non-limiting technology improvements include improvements in combustion performance of internal combustion engines, improvements in emissions performance, aftertreatment system performance, engine torque generation and torque control, engine fuel economy performance, improved durability of exhaust system components for internal combustion engines, and engine noise and vibration control. Without limitation, example and non-limiting technological fields that are improved include the technological fields of internal combustion engines and related apparatuses and systems as well as vehicles including the same.

Example parameters related to the operation of the engine 102 determined by sensors 142, 143, 144, 146, 148 which can be real or virtual, include any engine operating parameters that affect or can be correlated to the misfire conditions in or more of the cylinders 108, such as the exhaust manifold pressure, fresh air (intake) mass flow, charge mass flow, and/or EGR mass flow. In some embodiments, one or more of sensors 143 and/or sensors 148 are oxygen sensors such as universal exhaust gas oxygen (UEGO) or heated exhaust gas oxygen (HEGO) sensors, and engine sensor(s) 144 measure a crank angle position of engine 102. Further example and non-limiting parameters related to the operation of the engine 102 measured by engine sensor(s) 144 can include an induction gas temperature at the intake passage 114, an induction gas temperature at the intake manifold 112, an induction gas pressure at the intake manifold 112, an exhaust gas temperature at the exhaust manifold 116, an exhaust gas pressure at the exhaust manifold 116, an exhaust gas temperature at the inlet and/or outlet of the exhaust passage 120, an exhaust gas pressure at the inlet and/or outlet of the exhaust passage 120, an exhaust gas temperature at the inlet and/or outlet of the EGR passage 118, an exhaust gas pressure at the inlet and/or outlet of the EGR passage 118, a lift, duration and/or timing of an intake valve and/or an exhaust valve of cylinders 108, a speed of compressor 126, a geometry, position and/or speed of the turbine 128, a composition of induction gas and/or EGR gas, an engine speed value, an engine load, engine torque, engine power output value, an engine knock value, and/or combinations thereof. Fuel sensor(s) 146 can measure or provide a signal indicative of a rate of fuel injection, a type of fuel injected, and/or a composition of the fuel. Additionally or alternatively, an example parameter includes a rate of change or other transformation of any described parameter. The listed parameters are exemplary and non-limiting.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted or determined parameter can be calculated, and/or by referencing a default value that is interpreted or determined to be the parameter value.

In certain embodiments, the controller 140 provides a control command, and one or more components of the system 100 are responsive to the control command. The control command, in certain embodiments, includes one or more messages, and/or includes one or more parameters structured to provide instructions to the various engine components responsive to the control command. An engine component responding to the control command may follow the command, receive the command as a competing instruction with other command inputs, utilize the command as a target value or a limit value, and/or progress in a controlled manner toward a response consistent with the engine control command.

Certain systems are described in the following, and include examples of controller operations in various contexts of the present disclosure. In one embodiment shown in FIG. 2, a control procedure 200 includes an operation 202 to check whether enable conditions are present to sample exhaust manifold pressure (EMP) data from one or more of the sensors, such as EMP sensor 142 and/or oxygen data from oxygen sensor 143. The EMP data may also include associated data such as a crank angle position of the engine 102 that is associated with the EMP measurement. The oxygen data may also include associated data such as a fuel amount to the cylinders 108 of the engine 102 that is associated with the oxygen measurement. Enable conditions can include any suitable condition for monitoring misfire and/or AFR imbalance conditions, such as the presence or absence of sensor faults and other fault codes, a number of engine revolutions between samples, etc. In various embodiments, the enable conditions may include, for example, the engine speed being greater than a threshold, the mass air flow to the engine being greater than a threshold, a time duration for enablement conditions being present being greater than a threshold time duration, and/or a sampling requirement. Conditional 204 returns procedure 200 to operation 202 if enable conditions are not present.

Figure 2:
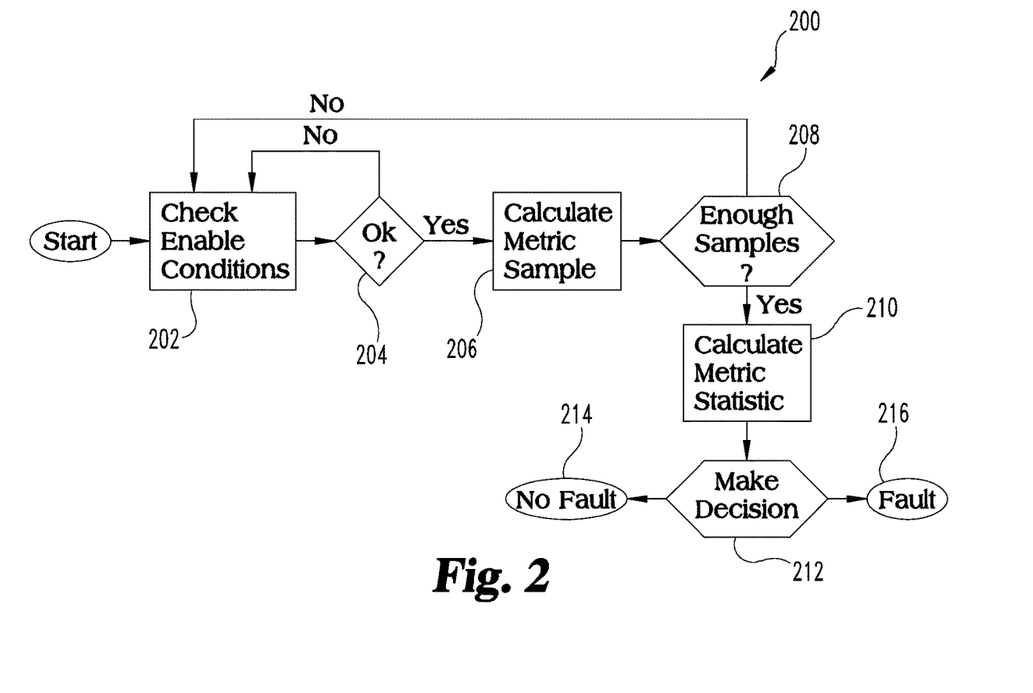
FIG. 2 is a flow diagram of one embodiment of a control procedure for misfire condition and/or AFR imbalance condition diagnosis for the system of FIG. 1.

If enable conditions are present at conditional 204, procedure 200 continues at operation 206 to calculate the metric sample. The metric sample will depend on the particular method or algorithm to be employed in determining the misfire and/or AFR imbalance condition, as discussed further below. Procedure 200 continues at conditional 208 to determine if enough samples are calculated to continue with a statistical analysis of the metric samples. If conditional 208 is no, procedure 200 returns to operation 202 to continue to collect data if enable conditions are present. If conditional 208 is yes, procedure 200 continues at operation 210 to calculate the metric statistic. At conditional 212 the procedure 200 determines either the absence of a misfire condition and/or AFR imbalance condition at "No Fault" output 214 or the presence of a misfire condition and/or AFR imbalance condition at "Fault" output 216.

Figure 3A:
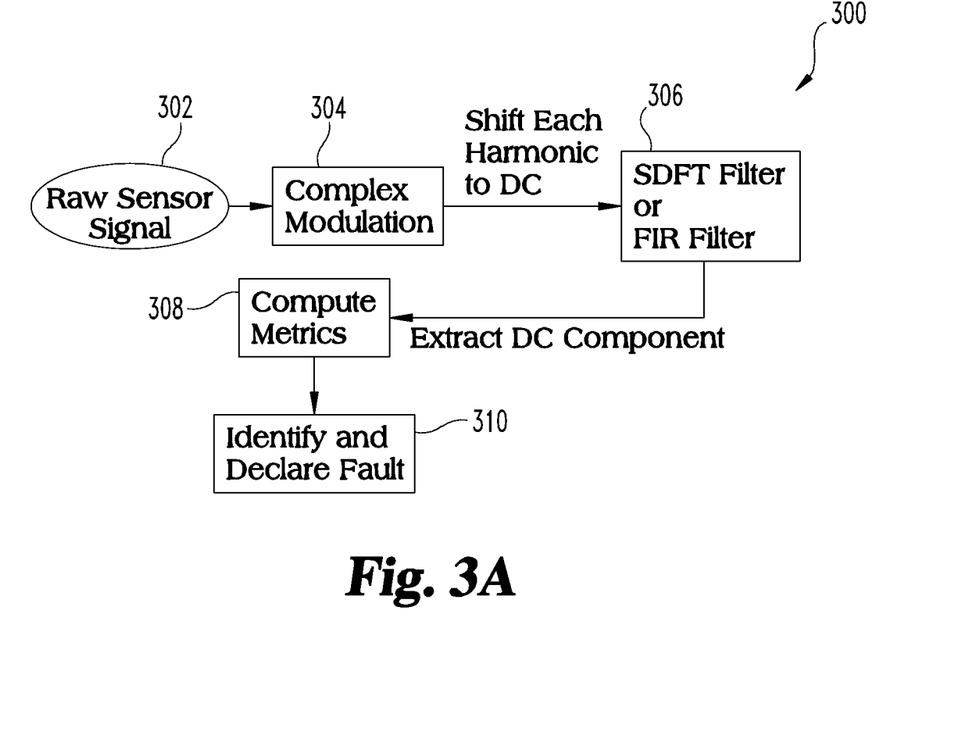
FIGS. 3A-3E include a flow diagram and control diagrams of other embodiments of control procedures for misfire condition and/or AFR imbalance condition diagnosis for the system of FIG. 1.

FIG. 3A shows a flow diagram of a procedure 300 that involves EMP and/or oxygen sensor signal modulation. The raw sensor signal modulation allows misfire and/or AFR imbalance detection and location with spectral analysis of harmonic contents of EMP and/or oxygen sensor signals. In procedure 300, the raw signal data is input at 302. At operation 304, the complex modulation of the raw signal data is performed to shift multiple harmonics content to DC. At operation 306 the modulated data is passed through a SDFT filter or a FIR filter in order to extract the DC component from the modulated data. Each extracted DC component includes amplitude and initial phase information of each harmonic component in the raw signal data. At operation 308 the metrics are computed and at operation 310 a fault is identified. Procedure 300 provides various benefits such as a lower memory requirement compared to a signal averaging method, better bandwidth separate compared to low/high band pass filter methods, and lower calibration effort as compared to a windowing method.

Complex modulation with the nth frequency is given by:

$$x_{mod,n}(k) = x(k) = \exp\left(-\frac{j2kn\pi}{N}\right) \quad \text{Equation 1}$$

If x(k) is harmonic, the modulated signal with a first harmonic can be represented as:

$$x_{mod,1}(k) = \left(A_0 + A_1\cos\left(\frac{2k\pi}{N} + \phi_1\right) + A_2\cos\left(\frac{4k\pi}{N} + \phi_2\right) + \ldots\right) \quad \text{Equation 2}$$
$$\left(\cos\left(\frac{2k\pi}{N}\right) - j\sin\left(\frac{2k\pi}{N}\right)\right)$$

The modulated signal can be represented as follows:

$$x_{mod,1}(k) = \left(\frac{A_1}{2}\cos(\phi_1) + A_0\cos\left(\frac{2k\pi}{N}\right) + \right. \quad \text{Equation 3}$$
$$\frac{A_2}{2}\cos\left(\frac{2k\pi}{N} + \phi_2\right) + \frac{A_1}{2}\cos\left(\frac{4k\pi}{N} + \phi_1\right) + \ldots\right) +$$
$$j\left(\frac{A_1}{2}\sin(\phi_1) - A_0\sin\left(\frac{2k\pi}{N}\right) + \frac{A_2}{2}\sin\left(\frac{2k\pi}{N} + \phi_2\right) - \right.$$
$$\left.\frac{A_1}{2}\sin\left(\frac{4k\pi}{N} + \phi_1\right) + \ldots\right)$$

The DC component of the modulated signal is as follows:

$$x_{mod,1dc}(k) = \frac{A_1}{2}\cos(\phi_1) + \frac{jA_1}{2}\sin(\phi_1) \quad \text{Equation 4}$$

It can also be applied to other harmonics similarly as follows:

$$x_{mod,2dc}(k) = \frac{A_2}{2}\cos(\phi_2) + \frac{jA_2}{2}\sin(\phi_2) \quad \text{Equation 5}$$

$$x_{mod,3dc}(k) = \frac{A_3}{2}\cos(\phi_3) + \frac{jA_3}{2}\sin(\phi_3) \quad \text{Equation 6}$$

Figure 3B:
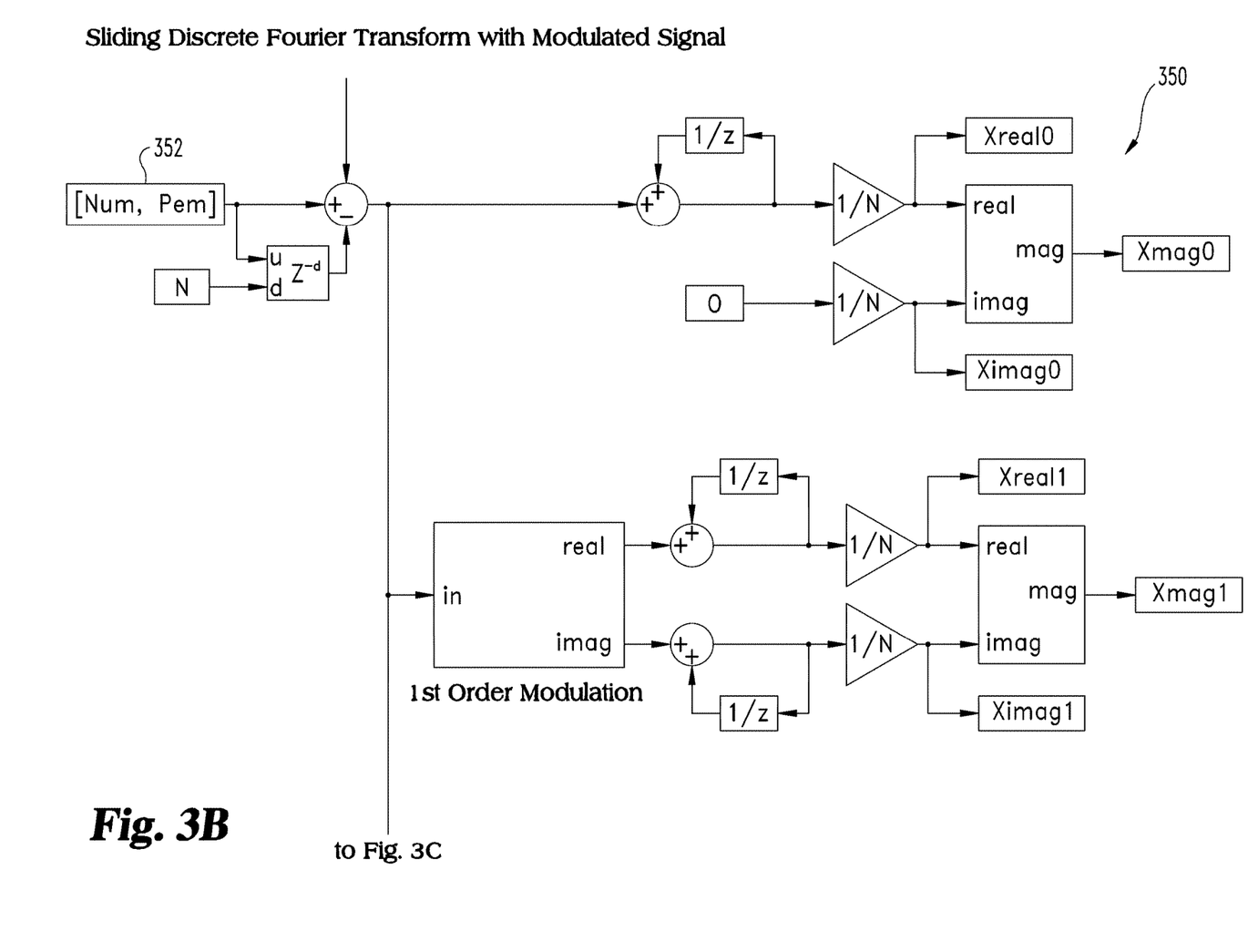
Figure 3C:
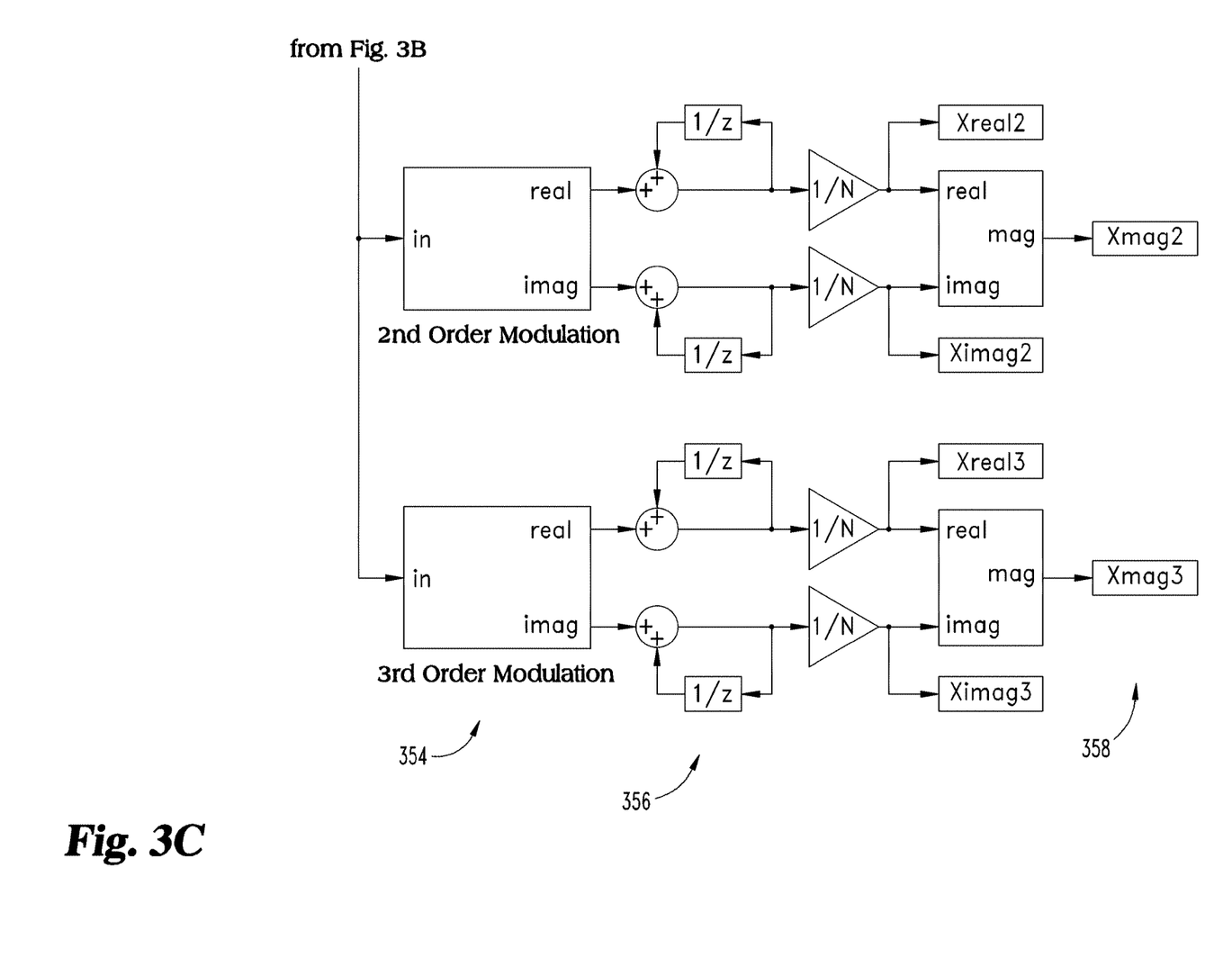

FIGS. 3B-3C show a control logic diagram 350 of the SDFT filter with the modulated raw signals form the EMP sensor(s) and/or oxygen sensor(s) as an input 352. The control logic diagram 350 includes first, second, and third order modulations 354 of the raw signals to shift each harmonic to the DC. The modulated signals are each then passed through the SDFT filters 356 to extract the DC component to obtain monitoring parameters 358. The monitoring parameters 358 can be compared to predetermined criteria to establish whether or not a misfire and/or AFR imbalance condition is present. The predetermined criteria, as used herein, can include any suitable criteria, such as a magnitude of the extracted DC frequency component, the magnitude of the pressure oscillations of the respective cylinders, etc. being greater than a threshold amount indicative of a misfire condition.

Figure 3D:
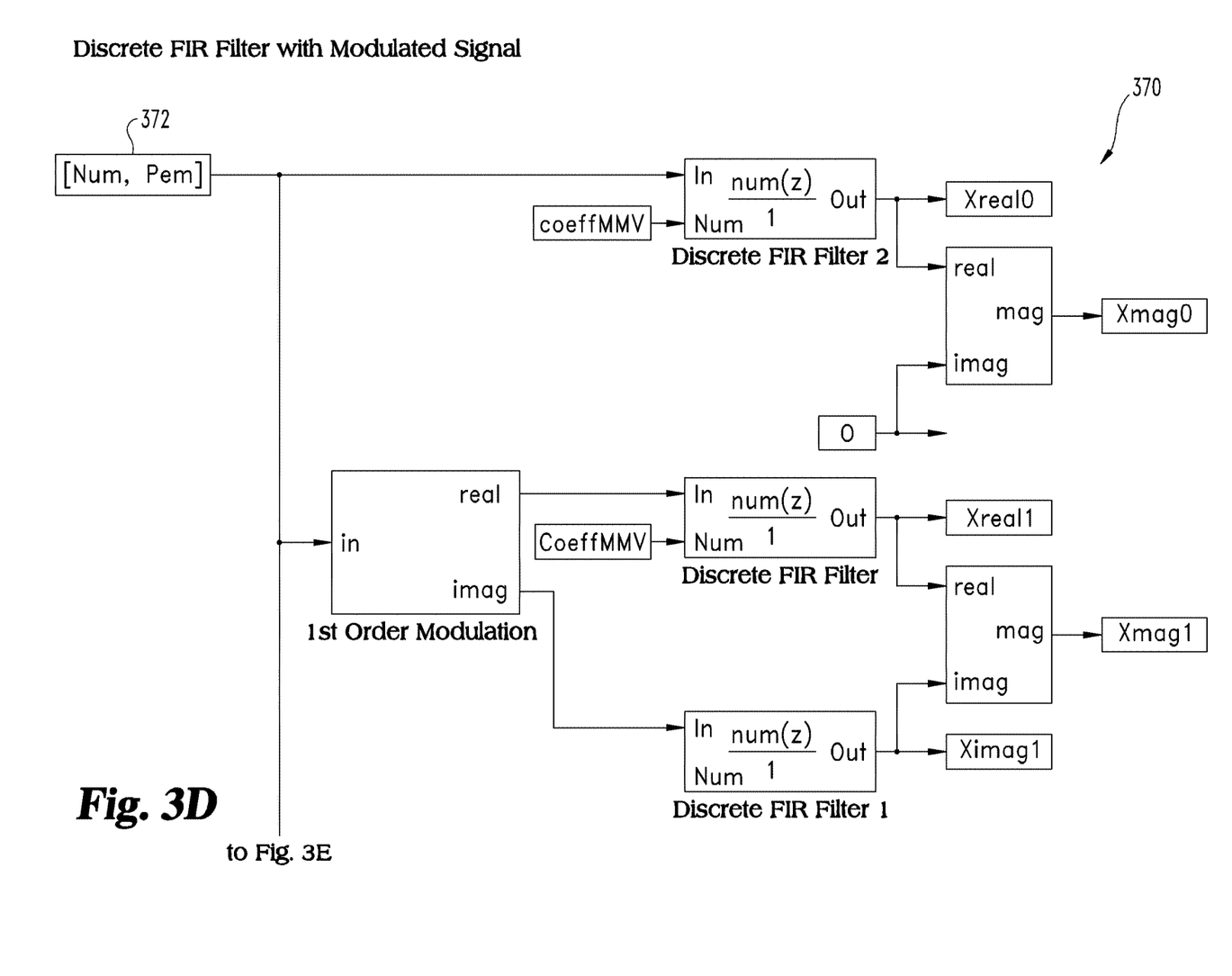
Figure 3E:
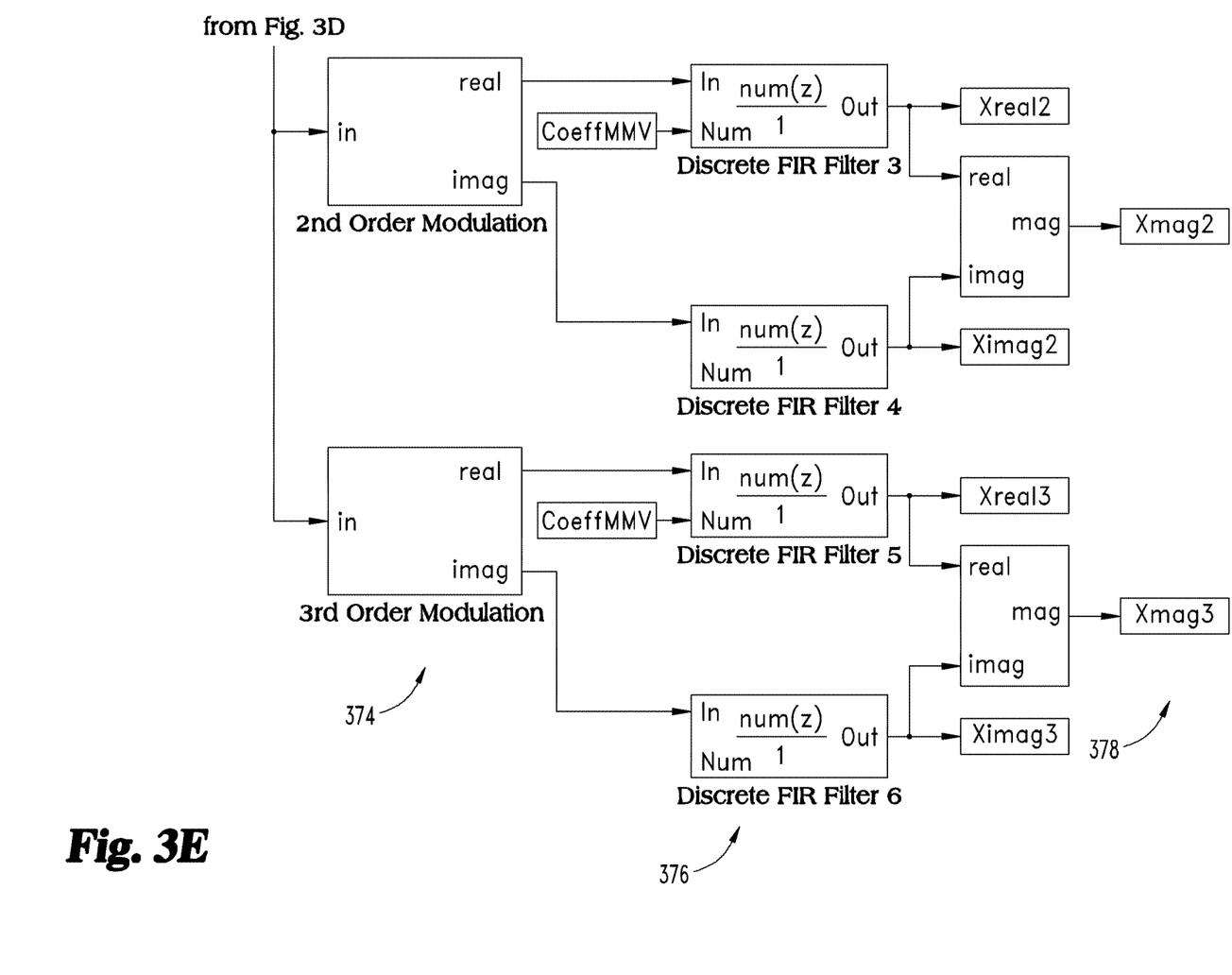

FIGS. 3D-3E show a control logic diagram 370 of the FIR filter with the modulated raw sensor signals as an input 372. The control logic diagram 370 includes first, second, and third order modulations 374 of the raw sensor signals to shift each harmonic to the DC. The modulated signals are each then passed through the FIR filters 376 to extract the DC component to obtain monitoring parameters 378. The monitoring parameters 378 can be compared to predetermined criteria to establish whether or not a misfire and/or AFR imbalance condition is present.

Figure 4A:
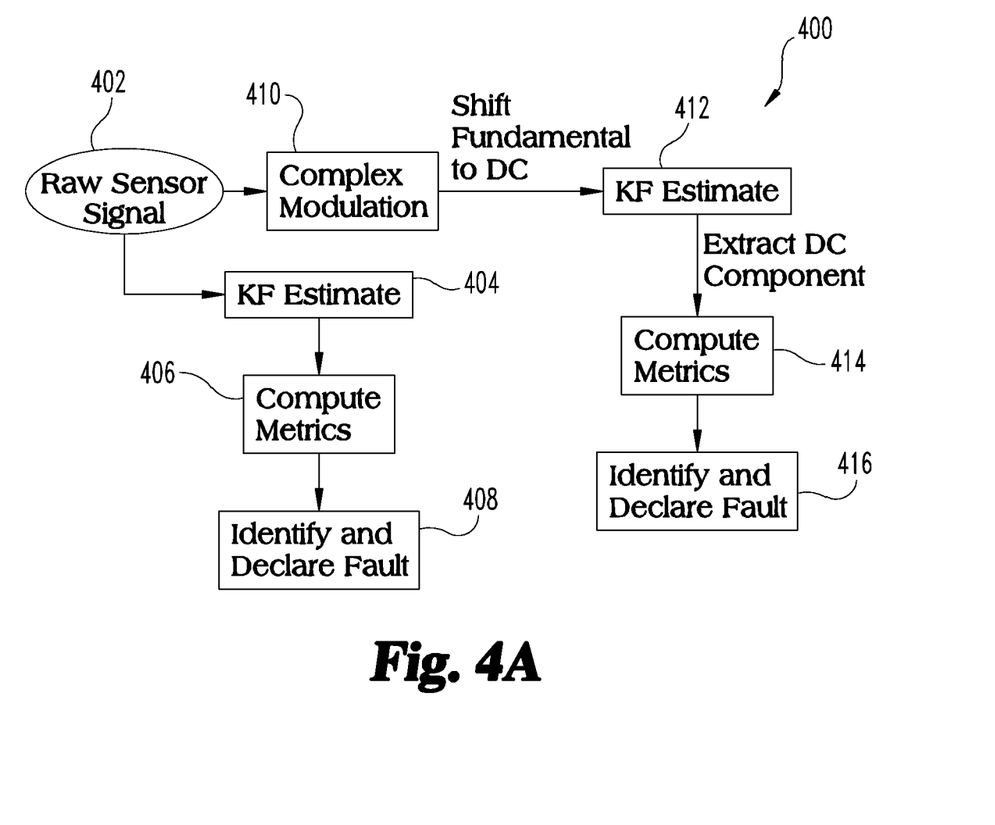
FIGS. 4A-4E include a flow diagram and control diagrams of other embodiments of control procedures for misfire condition and/or AFR imbalance condition diagnosis for the system of FIG. 1.

Referring to FIG. 4A, another embodiment procedure 400 is shown in which a Kalman filter is applied to the raw sensor signal data from the EMP and/or oxygen sensor(s) or to the modulated signal data collected at input 402. At operation 404, a KF estimate is obtained based on the raw signal data. Metrics are computed at operation 406 based on the filtered raw signal data in order to identify and declare a fault at operation 408 in response to a misfire condition and/or AFR imbalance being determined as present based on the metrics.

In another embodiment, the procedure 400 includes an operation 410 for complex modulation of the raw signal data as discussed above to shift the fundamental frequency to DC. The procedure 400 continues at operation 412 to provide a KF estimate for the modulated data to extract a DC component. Procedure 400 continues at operation 414 to compute metrics to identify and declare a fault at operation 416 in response to a misfire condition and/or AFR imbalance condition being identified.

In procedure 400, the harmonic signal is represented as:

$$x(k) = A_0(k) + \sum_{p=1}^{N_{harm}} \sum_{q=1}^{N_{cyl}} A_{pq}(k)\cos\left(\frac{2\pi pk}{N} + \phi_{pq}\right) \quad \text{Equation 7}$$

This signal can be modeled via the following state space model:

$$\xi(k+1) = \begin{bmatrix} 0 & 0 & 0 & 0 \\ 0 & A^1_{2\times 2}(k) & 0 & 0 \\ 0 & 0 & A^2_{2\times 2}(k) & 0 \\ 0 & 0 & 0 & \ddots \end{bmatrix} \xi(k) + v(k) \quad \text{Equations 8-11}$$

-continued $$x(k) = [1 \ 0 \ 1 \ 0 \ 1 \ \ldots ]\xi(k) + w(k)$$

where $$A_{2\times 2}^n(k) = \begin{bmatrix} \cos\dfrac{2n\pi}{N} & -\sin\dfrac{2n\pi}{N} \\ \sin\dfrac{2n\pi}{N} & \cos\dfrac{2n\pi}{N} \end{bmatrix} \text{ and }$$

$$\xi(k) = \begin{bmatrix} A_0(k) & A_1(k)\cos\left(\dfrac{2\pi k}{N}+\phi_1\right) & A_1(k)\sin\left(\dfrac{2\pi k}{N}+\phi_1\right) & \ldots \end{bmatrix}^T$$

After modulation of the sensor signal to shift harmonics to DC, the state vector zeta(k) can be estimated view KF. The estimated DC is the first element of the estimated state vector.

Figure 4B:
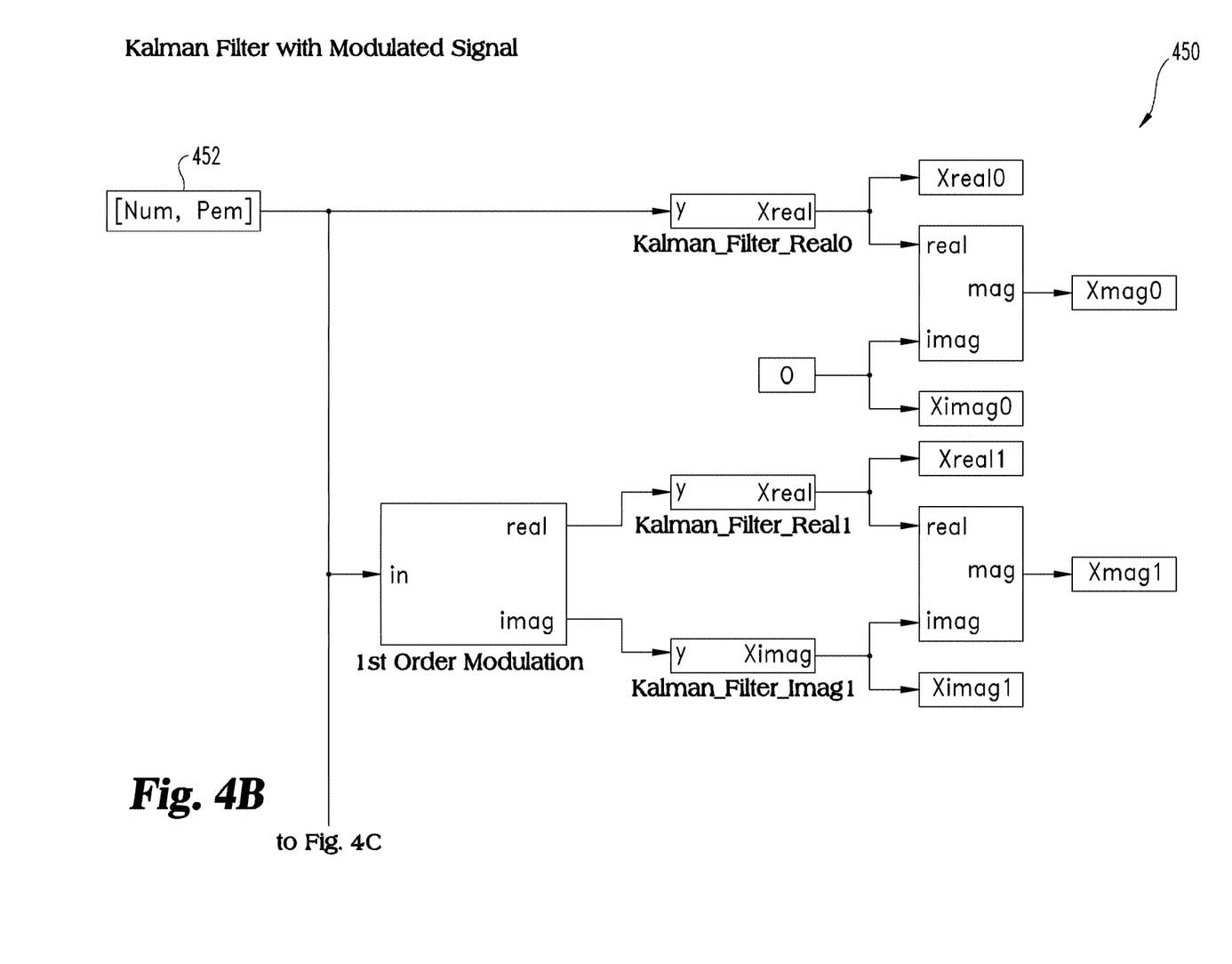
Figure 4C:
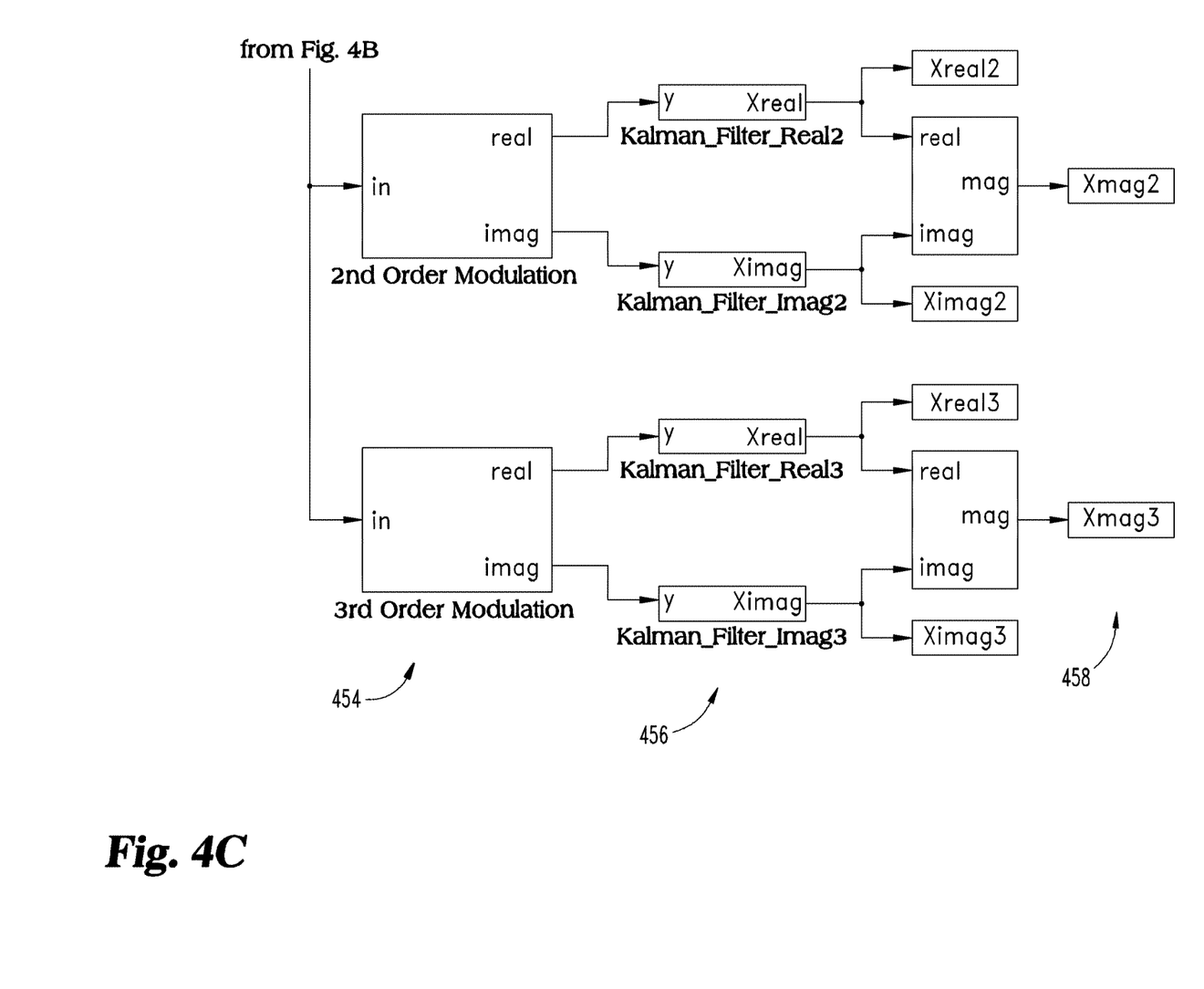

FIGS. 4B-4C show a control logic diagram 450 of the Kalman filter with the modulated raw sensor signals as an input 452. The control logic diagram 450 includes first, second, and third order modulations 454 of the raw sensor signals to shift each fundamental frequency to the DC. The modulated signals are each then passed through the Kalman filters 456 to extract the DC component to obtain monitoring parameters 458. The monitoring parameters 458 can be compared to predetermined criteria to establish whether or not a misfire and/or AFR imbalance condition is present.

Figure 4D:
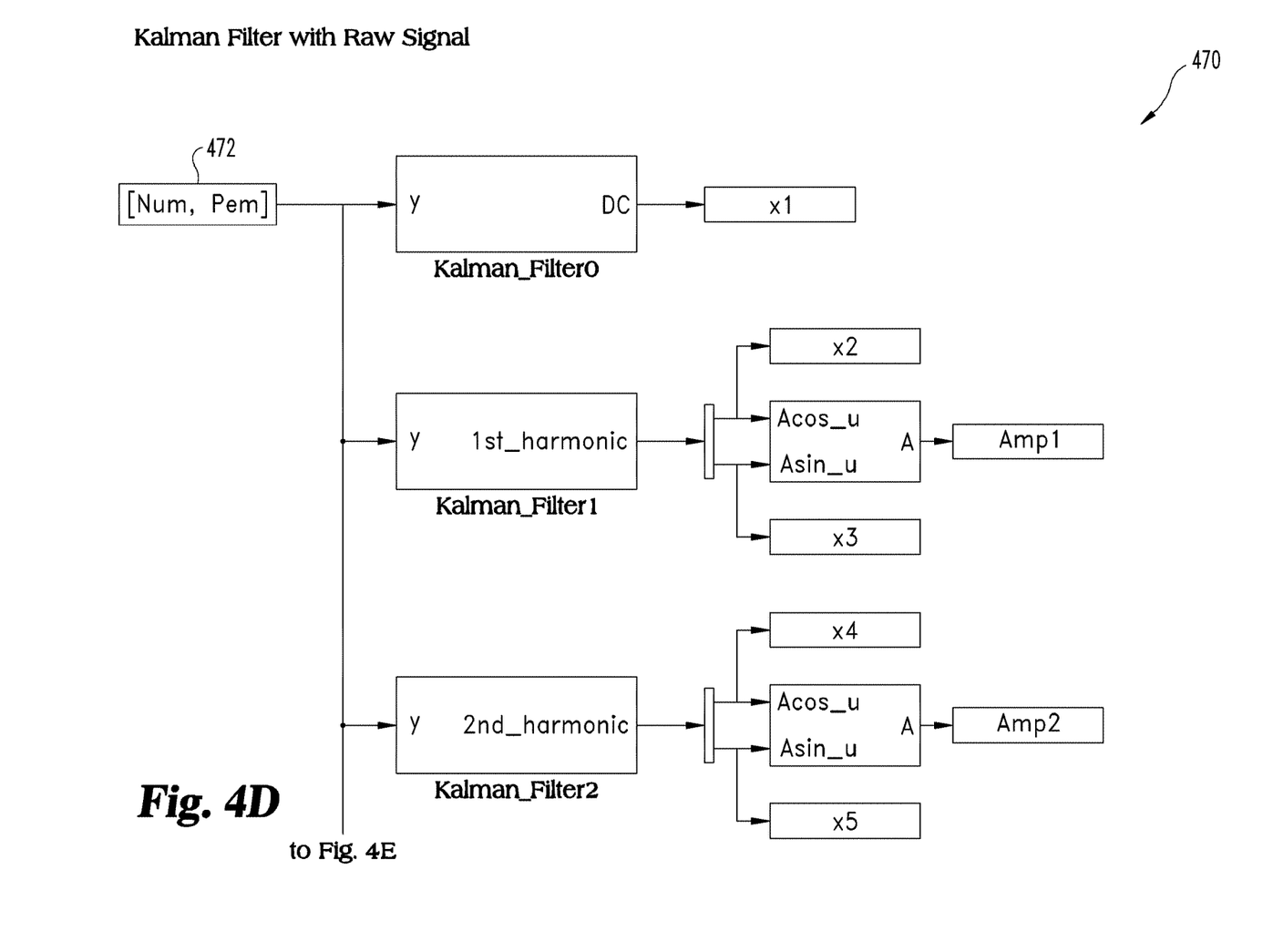
Figure 4E:
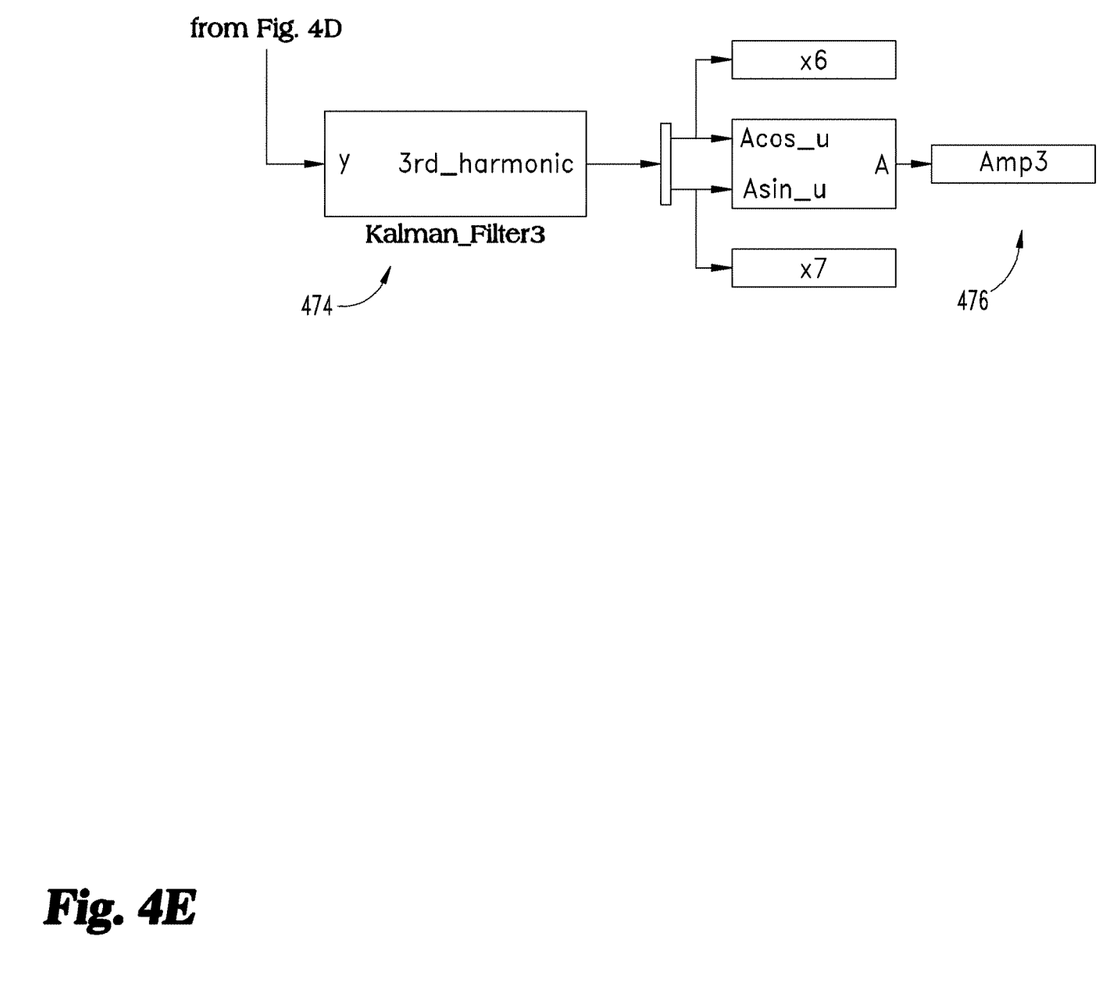

FIGS. 4D-4E show a control logic diagram 470 of the Kalman filter without modulation of the raw sensor signals received from an input 472. The control logic diagram 470 includes applying a Kalman filter to each of the first, second, and third harmonics 474 of the raw sensor signals. The filtered signals are each then evaluated to obtain monitoring parameters 476. The monitoring parameters 476 can be compared to predetermined criteria to establish whether or not a misfire and/or AFR imbalance condition is present.

In certain embodiments, controller 140 can be configured to provide a command to one or more of the cylinders 108 in response to the cylinder misfire and/or AFR imbalance condition that reduces the occurrence of the misfire and/or AFR imbalance condition, such as a fueling command, ignition timing command, etc. As a result, the fueling amount and/or ignition timing provided to identified cylinder(s) contributing to the misfire and/or AFR imbalance condition from the fueling amount and/or ignition timing provided to the other cylinders 108, for example.

Various aspects of the present disclosure are contemplated. Examples are provided in the claims appended hereto, and any combination of features recited in the claims are contemplated.

In one aspect, the procedures described above for diagnosing a misfire condition during operation of an internal combustion engine include: determining one or more enable conditions for diagnosing the misfire condition are met; in response to one or more enable conditions being met, providing raw EMP signals from an EMP sensor to a controller; performing a spectral analysis on multi-harmonics of the raw EMP signals; determining a monitoring parameter associated with the misfire condition in response to the spectral analysis; comparing the monitoring parameter to pre-defined criteria; and if the monitoring parameter satisfies the pre-defined criteria, determine and/or output a misfire condition fault.

The spectral analysis can include a SDFT filter, a FIR filter, or a Kalman filter. The raw EMP signals can be modulated to shift multi-harmonics to a DC component before performing the spectral analysis. In this case, the spectral analysis can include a SDFT or FIR filter of the modulated data to extract the DC component of the raw EMP signals, the DC component including amplitude and initial phase data for each harmonic component of the raw EMP signals. A Kalman filter could also be applied to the modulated data.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method for diagnosing operation of an internal combustion engine, the method comprising:
    determining whether an enable condition for diagnosing one of a misfire condition and the an AFR imbalance condition of the engine is met;
    in response to the enable condition being met, providing a raw sensor signal to a controller, the raw sensor signal being a signal of at least one of an exhaust manifold pressure (EMP) sensor and an oxygen sensor;
    shifting multi-harmonic content of the raw sensor signal to DC, the shifting multi- harmonic content including performing at least a first modulation of the raw sensor signal and a second modulation of the of the raw sensor signal, the first modulation being of a different order than the second modulation;
    performing a spectral analysis on the multi-harmonic content of the raw sensor signal shifted to DC;
    extracting one or more frequency components from the spectral analysis using a signal processing method;
    determining a monitoring parameter associated with the one or more of the misfire condition and the AFR imbalance condition based on the frequency components;
    comparing the monitoring parameter to pre-defined criteria; and
    if the monitoring parameter satisfies the pre-defined criteria, determining one of a misfire condition fault and an AFR imbalance condition fault.

2. The method of claim 1, wherein the spectral analysis includes a sliding discrete Fourier transform filter.

3. The method of claim 1, wherein the spectral analysis includes a finite impulse response filter.

4. The method of claim 1, wherein the spectral analysis includes a Kalman filter.

5. The method of claim 1 wherein the shifting multi-harmonic content of the raw sensor signal to DC shifts multi-harmonics to a DC component before performing the spectral analysis.

6. The method of claim 5, wherein the spectral analysis includes a sliding discrete Fourier transform filter of the modulated data to extract the DC component of the raw sensor signal, the DC component including amplitude and initial phase data for each harmonic component of the raw sensor signal.

7. The method of claim 5, wherein the spectral analysis includes a finite impulse response filter to extract the DC component of the raw sensor signal, the DC component including amplitude and initial phase data for each harmonic component of the raw sensor signal.

8. The method of claim 5, wherein the spectral analysis includes a Kalman filter applied to the modulated data.

9. The method of claim 1, further comprising controlling at least one of a fueling amount and an ignition timing of at least one of the cylinders of the internal combustion engine in response to the one of the misfire condition fault and the AFR imbalance condition fault being determined.

10. An apparatus for diagnosing an internal combustion engine, the apparatus comprising:
an electronic controller configured to receive raw sensor signal from one of an exhaust manifold pressure sensor and an oxygen sensor during operation of the internal combustion engine, the electronic controller configured, in response to an enable condition for diagnosing one of the misfire condition and the AFR imbalance condition being met, to:
shift multi-harmonic content of the raw sensor signal to a DC component;
perform a spectral analysis on multi-harmonics of the raw sensor signal shifted to the DC component;
extract one or more frequency components from the spectral analysis using a signal processing method;
determine a monitoring parameter associated with the one of the misfire condition and the AFR imbalance condition using the extracted frequency components;
compare the monitoring parameter to a pre-defined criteria associated with the one of the misfire condition and the AFR imbalance condition; and
if the monitoring parameter satisfies the pre-defined criteria, determine one of a misfire condition fault and an AFR imbalance condition fault.

11. The apparatus of claim 10, wherein the spectral analysis includes a sliding discrete Fourier transform filter.

12. The apparatus of claim 10, wherein the spectral analysis includes a finite impulse response filter.

13. The apparatus of claim 10, wherein the spectral analysis includes a Kalman filter.

14. The apparatus of claim 10, wherein the controller is configured to shift multi-harmonic content of the raw sensor signal to a DC component by modulating the raw signal data to shift multi-harmonics to DC components before performing the spectral analysis.

15. The apparatus of claim 14, wherein the spectral analysis includes a sliding discrete Fourier transform filter of the modulated data to extract the DC component of the raw sensor signal, the DC component including amplitude and initial phase data for each harmonic component of the raw sensor signal.

16. The apparatus of claim 14, wherein the spectral analysis includes a finite impulse response filter to extract the DC component of the raw sensor signals, the DC component including amplitude and initial phase data for each harmonic component of the raw sensor signal.

17. The apparatus of claim 14, wherein the spectral analysis includes a Kalman filter of the modulated data.

18. The apparatus of claim 10, wherein the controller is configured to control at least one of a fueling amount and an ignition timing of at least one of the cylinders of the internal combustion engine in response to the one of the misfire condition fault and the AFR imbalance condition fault.

* * * * *